US010911566B2

(12) United States Patent
Navarro et al.

(10) Patent No.: US 10,911,566 B2
(45) Date of Patent: Feb. 2, 2021

(54) PLAYLIST CREATOR FOR DIGITAL MEDIA AND MULTIMEDIA SCHEDULING AND DELIVERY PLATFORM

(71) Applicants: Ronaldo Cordero Navarro, Hacienda Heights, CA (US); Jocelyn Co, Chino, CA (US)

(72) Inventors: Ronaldo Cordero Navarro, Hacienda Heights, CA (US); Jocelyn Co, Chino, CA (US)

( * ) Notice: Subject to any disclaimer, the term of this patent is extended or adjusted under 35 U.S.C. 154(b) by 0 days.

(21) Appl. No.: 16/726,983

(22) Filed: Dec. 26, 2019

(65) Prior Publication Data

US 2020/0137190 A1  Apr. 30, 2020

Related U.S. Application Data

(62) Division of application No. 15/924,159, filed on Mar. 16, 2018, now Pat. No. 10,609,178.

(51) Int. Cl.
*H04L 29/08* (2006.01)
*H04L 29/06* (2006.01)

(52) U.S. Cl.
CPC .......... *H04L 67/32* (2013.01); *H04L 65/4084* (2013.01); *H04L 65/607* (2013.01); *H04L 67/306* (2013.01); *H04L 67/325* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 2003/0118014 A1* | 6/2003 | Iyer | H04N 21/4334 370/389 |
| 2005/0262257 A1* | 11/2005 | Major | H04N 21/64769 709/231 |
| 2006/0206912 A1* | 9/2006 | Klarfeld | H04N 21/251 725/40 |
| 2016/0241617 A1* | 8/2016 | Jelley | H04L 65/602 |

* cited by examiner

*Primary Examiner* — Cai Y Chen

(57) ABSTRACT

The system is a self-serve platform, which delivers user uploaded media and multimedia files, of varying playback durations, to a client computer connected to a digital display; which is set to receive executions for a scheduled playlist and punctually presents the playback of media and/or multimedia files in said playlist record. The system's included functions for schedule generation, schedule selection, and playlist creation contain unique, and embedded automatic functions, provide the capacity for making scheduling and delivery of media and multimedia files reliable, accessible, and cost efficient.

3 Claims, 2 Drawing Sheets

PLAYLIST CREATOR FOR DIGITAL MEDIA AND MULTIMEDIA SCHEDULING AND DELIVERY PLATFORM

CROSS REFERENCE TO RELATED APPLICATIONS

This application, which discloses and claims only subject matter disclosed in prior application Ser. No. 15/924,159, filed on Mar. 16, 2018 that claims the benefit of U.S. Provisional Application No. 62/472,049, filed on Mar. 16, 2017, appears to claim only subject matter directed to an invention that is independent and distinct from that claimed in the prior application Ser. No. 15/924,159, and names the inventor or at least one joint inventor named in the prior application. Accordingly, this application may constitute a divisional application. Should applicant desire to claim the benefit of the filing date of the prior application, attention is directed to 35 U.S.C. 120, 37 CFR 1.78, and MPEP § 211 et seq.

BACKGROUND

Field of Invention

The disclosure generally relates to the field of media and multimedia presentation and distribution systems, and more specifically, to creating a system with autonomous components to schedule and present media and multimedia of varying durations.

Description of Related Art

Out-of-home advertising, OOH, incorporates a variety of different means to present advertisements and create brand recognition, specifically, as relating to the art, in the form of static images, digital presentation of static images with set durations or exposure times, and more sophisticated digital presentation of video media. The widespread practice of using posters and billboards for advertising has slowly evolved to incorporate the use of more dynamic digital systems. These systems may feature engaging visual effects via digital signage such as digital posters, digital billboards, and even small digital displays.

While digital signage is more engaging and certain companies do offer viable means for private individuals and businesses to advertise digitally, these companies share common disadvantages that are unfortunately passed along to the advertiser. Many of these companies require time consuming and out-of-date practices, including: requiring person to person dialogue and correspondence to figure out scheduling, requirement of expensive investments such as large digital billboards which limits overall scalability reach, place large restrictions on the file types accepted, enforce unfair bidding systems that limit accessibility to many due to the very expensive and obscure rates, and lack automation and novelty that can lower rates and improve accessibility.

In general, the current state of the art lacks sophisticated automation processes that would improve accessibility, lacks a structure that can provide transparent scheduling with pricing, lacks a signage system that can process various media and multimedia file types of varying durations, and lacks a sustainable growth model due to the large capital investments required on businesses that rely on digital billboards.

BRIEF SUMMARY OF THE INVENTION

To address the disadvantages of current digital signage systems involved with digital advertisement placements, the system offers an accessible internet platform that allows users to simply create an account, upload their media or multimedia file(s), advertisement(s), or announcement(s), and individually schedule said file or files for playback on a digital display or selection of digital displays, available in client network. With this type of system, various file formats are accepted and, due to the encoding process, will allow users to upload image and video files alike, and schedule them for punctual presentation on selected digital displays. The system does not incorporate a bidding system and, due to the automated nature, will have low running costs to operate, passing along the savings to the advertisers. Scalability costs will also be low for the system due to majority of the digital displays available in the client network are planned to be small displays for mainly indoor with some outdoor use.

DETAILED DESCRIPTION

Figure 1A:
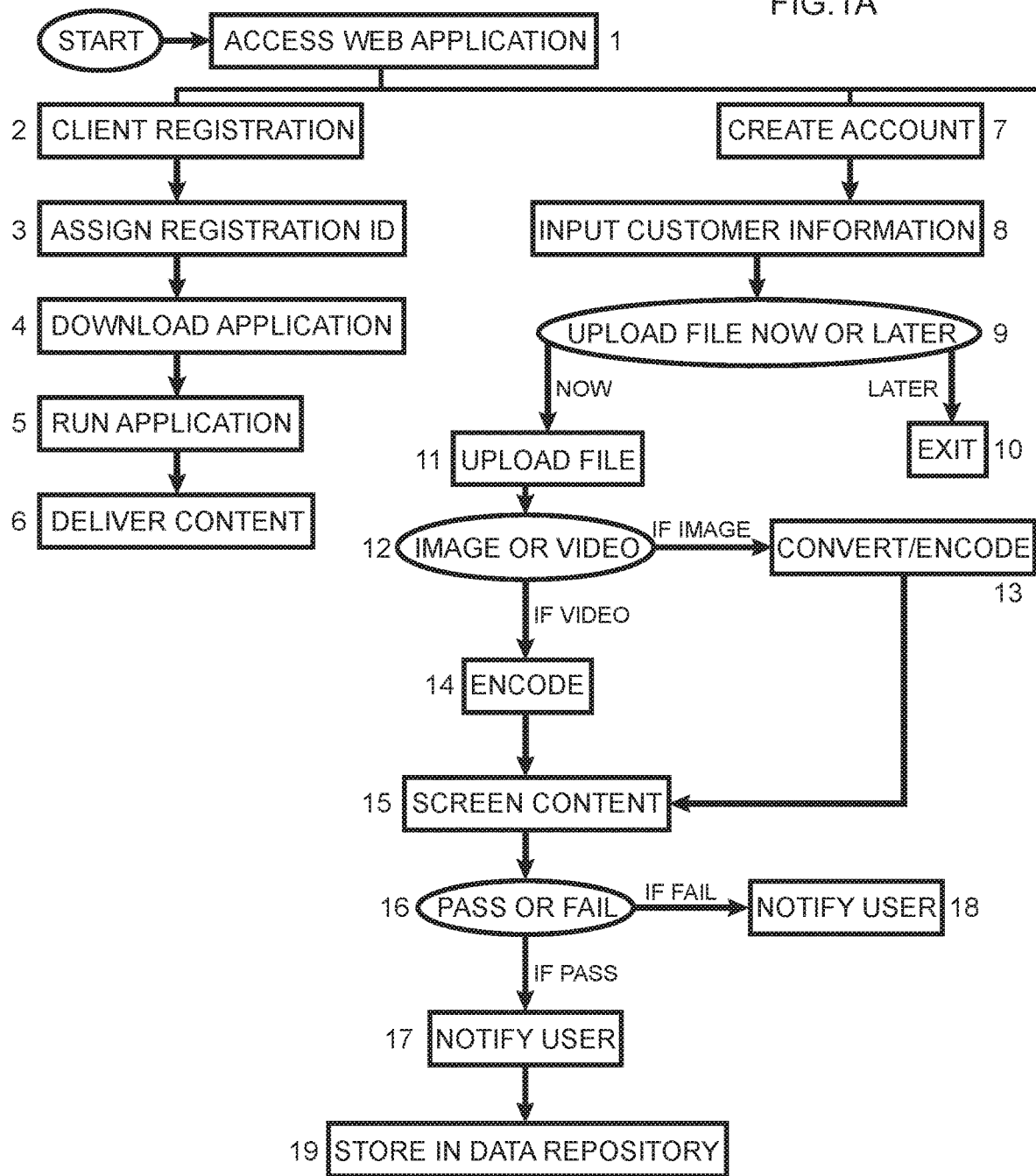
FIG. 1A depicts a partial view of one embodiment of the system in which two out of three main modules, CLIENT REGISTRATION and CREATE ACCOUNT, are illustrated.

The system includes a CLIENT REGISTRATION module 2, that allows a windows-based client computer, connected to an external digital display or a series of digital displays (that produce a scaled display), to establish connection to the server. The system creates a unique registration ID number illustrated in submodule ASSIGN REGISTRATION ID 3, for the respective client computer and stores this unique identifier in a database. The operator of the respective client computer is prompted to download the client application 4 through the website. Upon installation of the client application, the application runs 5, and the client computer's registration ID is verified to establish initial connection with the server. Upon successful registration, the server delivers pre-prepared filler files 6 (of media and multimedia content) to a designated storage in the client computer. This enables the client computer to commence display of respective filler files, pending playlist orders from scheduled media and multimedia files from respective user(s).

The system further includes a CREATE ACCOUNT module 7, that allows any user to create an account, which enables the user to upload and schedule their respective media and/or multimedia file for playback on registered client digital displays. After submission of pertinent user account information 8, such as email address, business name, business address, and phone number, the user's account is activated, and the user is prompted to either upload their media and/or multimedia file(s) to continue the session, or they can choose to upload at a later time 9. If the user decides to upload their media and/or multimedia file(s) at a'later time, the user can end the session 10. If the user chooses to upload their media and/or multimedia file(s) 11, the user is prompted to select between uploading an image or a video 12.

If the user selects to upload an image file 13, the user is prompted to assign a desired playback duration for said file. The system encodes said image file into a video file, in MP4 format with the H.264 codec, that has attributed playback duration that the user assigned in previous step. If the user selects to upload a video file, the system encodes said video file with its respective file property attributed duration, in MP4 format with the H.264 codec. The duration info, along with other pertinent data of the encoded file is written to a record in a designated data file on the server. The respective video file is stored in a separate storage on the server.

An additional process involved with the ENCODE submodule 14 is an edit process that truncates a temporal length that equates to the transition time that is imposed by the media player between playback of scheduled files. This process is necessary for maintaining scheduled start times in a punctual manner and maintains schedule integrity of respective playlists executed by the client application.

The system then moves the encoded file to a data file folder intended for access by the screening process 15, wherein the encoded files are accessed for manual screening through a server application. Screening is based on a video file content's subject matter, any resulting technical issues during encoding, and accurate metadata; and is approved or denied based on internal protocols. Each encoded file is assigned a pass or fail classification 16. The user is then notified of respective status by email and/or SMS 17 and 18, respectively. A pass classification allows the user to proceed to schedule the respective media or multimedia file. A fail classification denotes an end to the cycle for that respective file. The file is then stored 19 in a specific data file folder in the server's data repository, which contains copies of all screened files regardless of respective status.

Figure 1B:
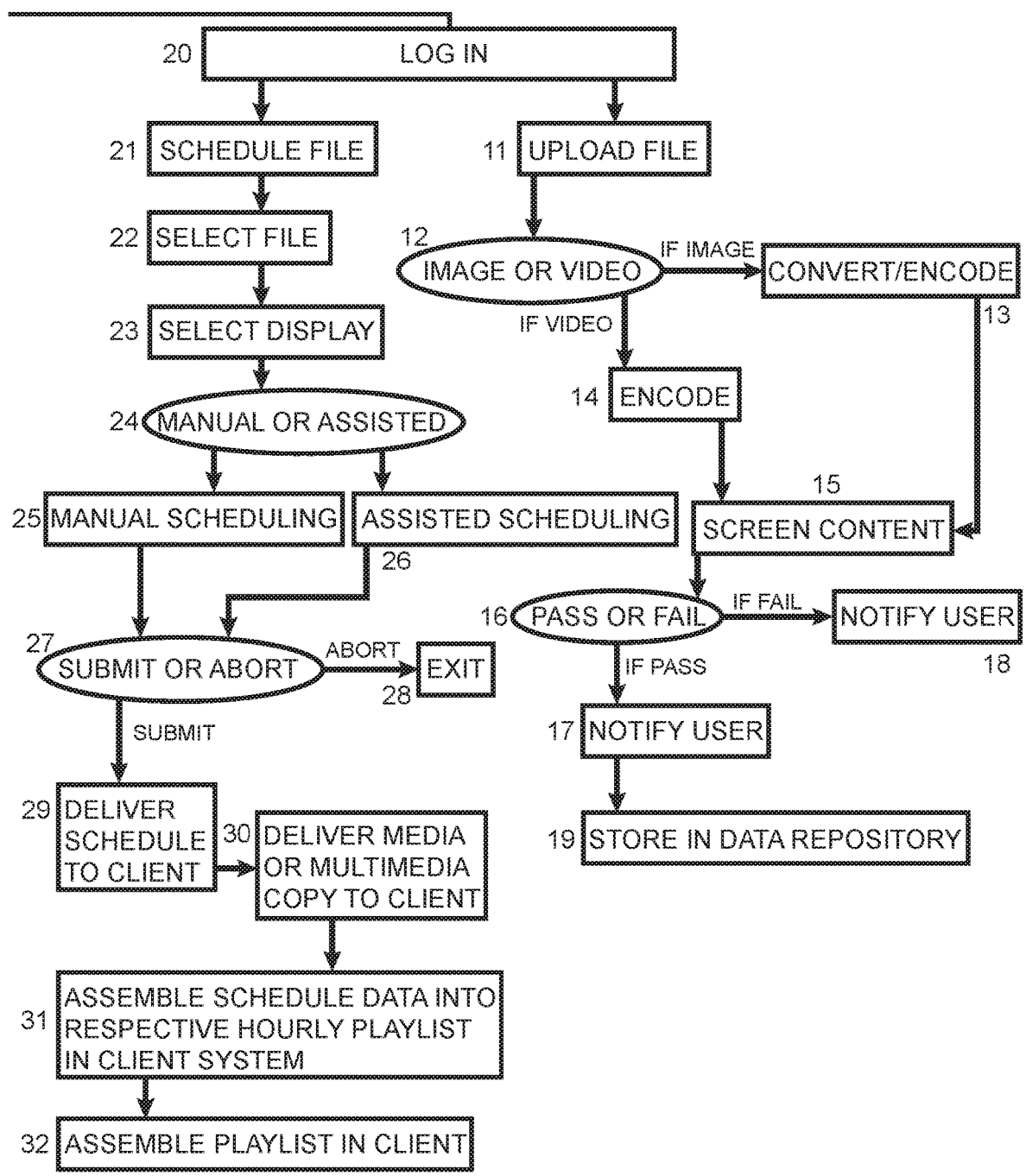
FIG. 1B depicts the accompanying partial view of the same embodiment of the system in which the third main module, LOG IN, is illustrated.

FIG. 1B depicts the third main module involving the LOG IN procedure 20. It also includes submodules 11-19, which are the same submodules found in FIG. 1A. Said submodules 11-19 are also depicted in FIG. 1B as required processes by said LOG IN procedure. Submodule SCHEDULE FILE, 21 is further described below.

Upon user selection of their respective media or multimedia file, illustrated in submodule SCHEDULE FILE 21, if said user only has one media or multimedia file attributed to their respective account, the system pre-selects 22 said user's media or multimedia file; If said user has more than one media and/or multimedia file attributed to their respective account, the system provides a drop-down list of said user's media and/or multimedia files available for selection 22.

Said user is then prompted to select the digital display 23, wherein respective client application is connected and to which the user wishes to schedule playback of their selected media or multimedia file. The availability of digital displays is subject to the user's media or multimedia file's conformity to respective display's requirements concerning: orientation and sizing of display's screen, content subject matter, and metadata accuracy.

Upon user's digital display selection, user is prompted to select 24 either a manual process of scheduling or an assisted process of scheduling their respective media or multimedia file. If manual scheduling 25 is selected, the system will prompt the user to select a calendar date, and upon selection of said calendar date, the system will display all available predefined time periods that contain available time slots, whereby each time slot has temporal length equal to user's media or multimedia file's playback duration. Additionally, the user would also have the option to enter a user-defined time period that would contain available time slots, whereby each time slot has temporal length equal to user's media or multimedia file's playback duration. The system will then display the available schedule items within each selected predefined, or assigned user-defined, time period.

If assisted scheduling 26 is opted for, the user will be prompted to enter a user-defined playback frequency and a user-defined time period, per selected date for user's media or multimedia file's playback. The system will generate a schedule of all possible schedule items, within applicable time period(s), wherein user's defined frequency criterion is met, per date selected.

The following description entails how the time slots, also referred to as schedule items, are configured and generated by the system. Schedule items hold scheduling positions in generated schedules, with each schedule item's temporal length being equal to each respective user media or multimedia file's duration. When assembled, these schedule items encompass the total available time in the generated schedule list, within a selected predefined, or assigned user-defined time period, within the selected calendar date. They are generated by algorithmic loops that analyze previously scheduled records of user submitted media and/or multimedia file(s), per respective calendar date file, if said calendar date file exists. Any applicable predefined, or user-defined, time period with no scheduled records is simply analyzed by: dividing the respective time period by the duration of said media or multimedia file, and creating a whole number of such schedule items that encompass the time beginning from the start of each applicable time period to the end of said time period; chronologically partitioning the schedule items into successive time slots, and any remainder is recycled. If previously scheduled records exist within said time period, the system analyzes the respective time period for each record with confirmed schedule, successively analyzing time gap differentials between start time of said time period and scheduled start time of the first record, scheduled end time of the first record and scheduled start time of next record, repeating this pattern until the time gap differential between the scheduled end time of the second to last record encompassed in said particular time period and the scheduled start time of the last record encompassed in said particular time period is examined, or if applicable, until the time gap differential between the scheduled end time of the last record encompassed in said particular time period and the end time of said particular time period is examined. The system further identifies the gaps or time slots that are at least temporally equal to the respective file's duration or divisible by said file's duration, and are chronologically organized and partitioned into selectable schedule items wherein each portion is of equal temporal length to said file's duration and listed as a selectable schedule item, with any remainder recycled. For purpose of providing further scheduling flexibility, the system generates during the schedule creating process a selectable schedule item that extends past the hourly threshold whenever conditions permit, wherein a temporal remainder from a previous hour period and a temporal gap at the beginning of the next hour period exist and combine into a continuous time slot that at least temporally equates to respective user media or multimedia file's duration.

Upon user submittal and confirmation 27, the server's calendar date, within its respective calendar month file, within its respective calendar year file, with respect to the scheduling data per user media or multimedia file, and the corresponding copies of each said calendar type files, located in the storage of the client computer, are updated 29 with said submitted schedule data and the respective media or multimedia file's metadata. If user cancels, the application will terminate the session 28.

Upon submittal and confirmation of schedule data transfer by the user, the system will also deliver a copy of said user's media or multimedia file 30 to respective client computer, if said client computer does not already contain said media or multimedia file in its storage.

The system employs alternating playlists wherein one is on active playback mode while the other playlist assembles ahead of the active playlist's conclusion and wherein the recently assembled playlist starts at the conclusion of the previously active playlist. Playlist data on client computer are analyzed for possible assembly 31 every hour on the half hour for punctual playback or display on respective client computer's digital display every hour on the hour or at immediate conclusion of playback of respective previous playlist. Each playlist is intended to encompass an hour in duration but can fluctuate depending on possible occurrences involving any overlap of a previous playlist's last file to the ensuing hour period. The playlist creation process is designed to produce clock time synchronicity per scheduled item encompassed in respective playlist. The system routinely scans pertinent files on an hourly basis on the half hour for possible playlist creation. Playlists are assembled if playlist creation criterion is met, wherein the temporal gap, ahead of the current playlist creation's scheduled assembly time, and between said playlist creation's scheduled assembly time and the scheduled end time of the last file in current active playlist, is at least 30 minutes and no longer than 90 minutes. To assemble playlist 32 scheduled to follow a current active playlist, the system routinely scans daily calendar files, which hold records containing metadata involving scheduled start times and scheduled end times of respective users' media or multimedia file(s), on an hourly basis and incorporates procedures that assemble records pertinent to said next playlist in chronological order. During assembly of the playlist, time gaps are identified, which may lie between a multitude of the following positions: between the beginning of the hour playlist and the scheduled start time of the first scheduled file for that hour, between the scheduled end time of the first scheduled file and the scheduled start time of the next scheduled file, between scheduled end time and scheduled start time, respectively, of any applicable number of files in the middle section of the hour, period, between the scheduled end time of the second to last scheduled file and the scheduled start time of the last scheduled file, or between the scheduled end time of the last scheduled file and the end of the hour playlist. With the gaps identified, the playlist assembles, and these gaps are matched with multimedia files found in a filler folder, which includes many such files of varying durations, and the process fills said gaps with said files to maintain scheduling integrity, respective per user's reserved schedule item(s), while attempting to use as many of the filler files as possible, limiting the reoccurrence of the same filler file in the playlist. For purpose of providing further scheduling flexibility, the system generates during the schedule creating process, a selectable schedule item that extends past the hourly threshold whenever conditions permit, wherein a temporal remainder from the previous hour period and a temporal gap at the beginning of the next hour period exist and combine into a continuous time slot that at least temporally equates to respective user media or multimedia file's duration. When such condition occurs and its selection as a selectable schedule item is executed, the ensuing playlist's start time would reflect the scheduled end time of said schedule item. This system capacity that can bridge hourly periods is scalable to process up to 15 gigabytes in media or multimedia file size per file, and approximately up to 10 hours in length, depending on originating format. When structured as such, and an extended file is involved that results in a conflict with the current playlist creation's scheduled assembly time, the system procedure of hourly scheduled playlist creation is automatically bypassed on a per hour basis at its scheduled time until the current playlist creation's scheduled assembly time reflects the clock time that is, at least 30 minutes to 90 minutes, ahead of the scheduled end time of the current and active playlist's last file.

BEST MODE OF IMPLEMENTATION

1. Below are the recommended hardware requirements for the server:
   Intel i5 or i7 processor;
   RAID 1 compatible motherboard;
   Windows 8 or newer operating system;
   64 GB of RAM for Windows Server 2016 Essentials;
   2×500 GB RAID 1 for Operating System;
   1 TB for data back up
2. Below are the recommended hardware requirements for the client computer and user's computing device:
   Dual Core processor;
   2 GB of RAM;
   32-bit or 64-bit Operating System
3. Below are incorporated Open-source software required for the system to run precisely:
   1. FFMPEG, an Open-source code platform, which is integrated in the system for efficient handling and encoding of media and multimedia data.
      Files are encoded to MP4 format with the H.264 codec.
      FFMPEG is licensed under GNU Lesser General Public License (LGPL)
   2. MediaInfo 0.7.62, an Open-source program, which is integrated in the system to retrieve necessary metadata of media and multimedia files. MediaInfo 0.7.62 is licensed under GNU Lesser General Public License (LGPL)

What is claimed is:
1. A computer implemented method of a playlist creator for punctual playback of scheduled media and multimedia files for a client system, comprising:
   a process that identifies, by a computer processor, records in a database of scheduled media and/or multimedia files pending playback on a digital display or plurality of digital displays available in client network;
   organizes said pending records of user-defined schedule items in chronological order pertinent to and for the next playlist scheduled for playback;
   identifies vacant time slot(s) or temporal gaps, within the period encompassed by said next playlist, that could be situated between the scheduled start time of said next playlist and scheduled start time of the first media or multimedia file in said next playlist, between scheduled end time of said first media or multimedia file in said next playlist and the scheduled start time of the second media or multimedia file in said next playlist, between similar points involving respective scheduled end time and scheduled start time of ensuing series of media and/or multimedia files in said next playlist, and/or between the scheduled end time of the last media or multimedia file in said next playlist and the scheduled end time of said next playlist;
   fills said vacant time slot(s) with duration-specific filler media and/or multimedia files or combination of filler media and/or multimedia files of varying durations available from a database to maintain scheduling integ- rity involving user scheduled media and/or multimedia files, within respective playlist, for punctual playback on client system;

and determines when to start playback of said next playlist on said client system.

2. A scheduled media and multimedia playlist creation system for punctual playback for a client system, comprising:

a computer processor, a routing engine executing on the computer processor and configured to:

identify, by a computer processor, records in a database of scheduled media and/or multimedia files pending playback on a digital display or plurality of digital displays available in client network;

organize said pending records of user-defined schedule items in chronological order pertinent to and for the next playlist scheduled for playback;

identify vacant time slot(s) or temporal gaps, within the period encompassed by said next playlist, that could be situated between the scheduled start time of said next playlist and scheduled start time of the first media or multimedia file in said next playlist, between scheduled end time of said first media or multimedia file in said next playlist and the scheduled start time of the second media or multimedia file in said next playlist, between similar points involving respective scheduled end time and scheduled start time of ensuing series of media and/or multimedia files in said next playlist, and/or between the scheduled end time of the last media or multimedia file in said next playlist and the scheduled end time of said next playlist;

fill said vacant time slot(s) with duration-specific filler media and/or multimedia files or combination of filler media and/or multimedia files of varying durations available from a database to maintain scheduling integrity involving user scheduled media and/or multimedia files, within respective playlist, for punctual playback on client system;

and determine when to start playback of said next playlist on said client system.

3. A non-transitory computer readable medium comprising a plurality of instructions for a playlist creator for scheduled media and/or multimedia files for a client system, the plurality of instructions comprising functionality to:

a computer processor, a routing engine executing on the computer processor and configured to:

identify, by a computer processor, records in a database of scheduled media and/or multimedia files pending playback on a digital display or plurality of digital displays available in client network;

organize said pending records of user-defined schedule items in chronological order pertinent to and for the next playlist scheduled for playback;

identify vacant time slot(s) or temporal gaps, within the period encompassed by said next playlist, that could be situated between the scheduled start time of said next playlist and scheduled start time of the first media or multimedia file in said next playlist, between scheduled end time of said first media or multimedia file in said next playlist and the scheduled start time of the second media or multimedia file in said next playlist, between similar points involving respective scheduled end time and scheduled start time of ensuing series of media and/or multimedia files in said next playlist, and/or between the scheduled end time of the last media or multimedia file in said next playlist and the scheduled end time of said next playlist;

fill said vacant time slot(s) with duration-specific filler media and/or multimedia files or combination of filler media and/or multimedia files of varying durations available from a database to maintain scheduling integrity involving user scheduled media and/or multimedia files, within respective playlist, for punctual playback on client system;

and determine when to start playback of said next playlist on said client system.

* * * * *